United States Patent Office 3,520,927
Patented July 21, 1970

3,520,927
ACYLATED TRICHLOROACETALDEHYDE AMINALS
Hugo Malz, Leverkusen, Ferdinand Grewe, Burscheid, August Dorken, Wuppertal-Sonnborn, and Helmut Kaspers, Leverkusen, Germany, assignors to Farbenfabriken Bayer Aktiengesellschaft, Leverkusen, Germany, a corporation of Germany
No Drawing. Filed July 11, 1967, Ser. No. 652,410
Claims priority, application Germany, July 14, 1966, F 49,691
Int. Cl. C07c *103/32*
U.S. Cl. 260—562                                                       12 Claims

ABSTRACT OF THE DISCLOSURE

N-(unsubstituted and halogen, alkoxy and/or alkylmercapto substituted -alkyl and -cycloalkyl as well as unsubstituted and halogen, alkyl, alkoxy, alkylmercapto, nitro, dialkyl-amino, cyano and/or aryloxy substituted -phenyl and -naphthyl)-N'-formyl-trichloroacetaldehyde aminals which possess fungicidal properties and which may be produced by reacting the corresponding isocyanates with N-(1-hydroxy-2,2,2-trichloro-ethyl)-formamide.

---

The present invention relates to and has for its objects the provision for particular new acylated trichloroacetaldehyde aminals, and more particularly formyl-trichloroacetaldehyde aminals, which possess fungicidal properties, active compositions in the form of mixtures of such compounds with solid and liquid dispersible carrier vehicles, and methods for producing such compounds and for using such compounds in a new way especially for combatting fungi, with other and further objects becoming apparent from a study of the within specification and accompanying examples.

It has been suggested that acylated trichloroacetaldehyde aminals can be used as fungicidally active compounds (see German Pat. No. 1,186,467), and that the fungicidally most active compounds have an acetyl radical as acyl radical attached to one nitrogen and a phenyl radical or a chlorinated phenyl radical attached to the other nitrogen.

Acylated trichloroacetaldehyde aminals which contain a formyl radical as acyl radical are so far unknown.

It has been found in accordance with the present invention that the particular new N-(unsubstituted and halogen, alkoxy and/or alkylmercapto substituted -alkyl and -cycloalkyl as well as unsubstituted and halogen, alkyl, alkoxy, alkylmercapto, nitro, dialkylamino, cyano and/or aryloxy substituted -phenyl and -naphthyl)-N'-formyl-trichloroacetaldehyde aminals, i.e., N-[(1-unsubstituted and halogen, alkoxy and/or alkylmercapto substituted -alkyl and -cycloalkyl as well as unsubstituted and halogen, alkoxy, alkylmercapto, nitro, dialkylamino, cyano, alkyl and/or aryloxy substituted -phenyl and -naphthyl- -amino-2,2,2-trichloro)-ethyl]-formamides having the formula

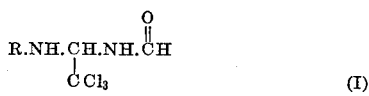
(I)

in which R is selected from the group consisting of alkyl having 1–18 carbon atoms, cycloalkyl having 5–8 ring carbon atoms, such alkyl and cycloalkyl which are correspondingly substituted with at least one substituent selected from the group consisting of halo, lower alkoxy, lower alkylmercapto, and mixtures of such substituents, phenyl, naphthyl, and such phenyl and naphthyl which are correspondingly substituted with at least one ring substituent selected from the group consisting of halo, lower alkyl, lower alkoxy, lower alkylmercapto, nitro, dilower-alkylamino, cyano, phenoxy, and mixtures of such ring substituents, exhibit strong fungicidal properties.

It has been furthermore found in accordance with the present invention that a versatile and smooth process for the production of the particular new formyl-trichloroacetaldehyde aminals of Formula I above in favorable yields may be provided, which comprises reacting isocyanate having the formula

in which R is the same as defined above with chloralformamide, i.e., N - (2,2,2 - trichloro - 1 - hydroxy - ethyl)-formamide, having the formula

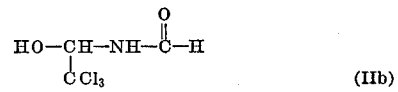
(IIb)

It is extremely surprising that the particular new trichloroacetaldehyde aminals of the present invention have a much stronger fungicidal activity than the previously known compounds of similar structure.

The course of an exemplary reaction for producing the particular new compounds of the present invention can be represented by the following equation:

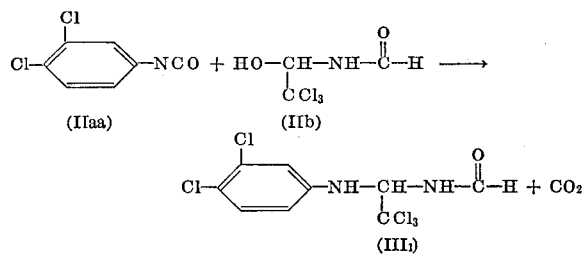

The reaction thus takes place with the splitting off of carbon dioxide.

In connection with the radical R in Formulae I and IIa, the preferred alkyl radicals are those with 1–18 carbon atoms, and the preferred cycloalkyl radicals are those with 5–8 carbon atoms. These radicals may be substituted preferably by chlorine, bromine and fluorine as well as alkoxy and alkylmercapto groups. When R is a phenyl or naphthyl radical, this radical may be substituted preferably by chlorine, bromine, fluorine, cyano, phenoxy, nitro, and by alkoxy, alkylmercapto, dialkylamino and alkyl. The substituent groups in question preferably contain 1–4 carbon atoms in their alkyl radicals.

For especially strongly fungicidally-active trichloroacetaldehyde aminals in accordance with the present invention, R may in particular be a phenyl radical or a 3,4-substituted phenyl radical containing as substituents halogen such as chlorine and/or bromine and/or fluorine and/or alkyl, in particular methyl, ethyl and/or isopropyl. Thus R may be a 3,4-dichlorophenyl, 3,4-dibromophenyl, 3-methyl - 4 - chloro or 3 - chloro - 4 - methylphenyl, 3-chloro - 4 - bromophenyl or 3 - fluoro - 4 - bromophenyl or 3-bromo-4-chlorophenyl radical.

The N - (2,2,2 -trichloro - 1 - hydroxyethyl) - formamide used as starting material is, like the isocyanates used, already known.

The production process reaction of the present invention can be carried out in the presence of inert solvents, if desired. Preferred inert organic solvents include aliphatic and aromatic hydrocarbons, such as benzene, toluene, xylenes and benzine, chlorinated hydrocarbons such as chlorobenzenes and carbon tetrachloride, ethers such as dioxan, furan and dibutyl ether, acetonitrile, esters such as ethyl acetate and ketones such as acetone, and the like.

In order to accelerate the reaction, if desired, small amounts of tertiary amines are expediently added. Particularly suitable are trialkylamines such as trimethylamine and triethylamine, dialkylanilines such as dimethylanilines and diethylanilines as well as pyridines, and the like.

The reaction temperatures for the production process of the present invention may be varied within a fairly wide range. In general, the reaction is carried out at a temperature substantially between about 0 and 150° C., preferably between about 10 and 100° C.

When carrying out the production process of the present invention, approximately equimolar amounts of the reactants may be used, expediently with the use of inert solvents and the addition of a small amount of tertiary amines. The end of the reaction can be discerned by the cessation of evolution of carbon dioxide.

After completion of the reaction, the reaction mixture may be worked up in the usual manner, for example, by distilling off the diluent or filtering off the precipitated active compound.

The instant reaction products are, in general, already very pure. They can be still further purified by recrystallization or sublimation, if desired.

Advantageously, the particular new active compounds of the present invention exhibit strong fungicidal activities. Because of their low toxicity to warm-blooded animals they are suitable for the control of undesired fungus growth. Their good compatibility with respect to higher plants allows their use as plant protection agents against fungoid plant diseases.

The instant active compounds are particularly effective against genuine mildew fungi (Erysiphaceae). To these there belong in the main the Erysiphe species, the Podosphaera species, the Sphaerotheca species and the Oidium species such as *Erysiphe cichoracearum, Podosphaera leucotricha, Sphaerotheca pannosa* and *Oidium Tuckeri*, and the like.

The particular active compound according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compound with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), ethers, ether-alcohols (for instance, glycol monomethyl ether, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agents, such as other organic or inorganic fungicides, herbicides, insecticides, acaricides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.000001–5%, preferably 0.00001–0.5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally about 0.000001–95%, and preferably 0.00001–95%, by weight of the mixture.

Furthermore, the present invention contemplates methods of selectively controlling or combatting fungi, which comprises applying to at least one of (a) such fungi and (b) their habitat, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The outstanding fungitoxic effectiveness of the particular new compounds according to the present invention, as well as their distinct superiority compared with known products of analogous constitution and the same type of activity, can be seen, by way of illustration and without limitation, from the following utility examples.

EXAMPLE 1

Erysiphe test:
  Solvent—4.7 parts by weight acetone
  Emulsifier—0.3 part by weight alkylaryl polyglycol ether
  Water—95 parts by weight The amount of the particular active compound required for the desired concentration of such active compound in the spray liquid is mixed with the stated amount of the solvent, and the concentrate is diluted with the stated amount of water containing the stated emulsifier.

Young cucumber plants (Delikatess variety) having about three foliage leaves are sprayed with the spray liquid until dripping wet. The cucumber plants remain in a greenhouse for 24 hours to dry. They are then, for the purpose of inoculation, dusted with conidia of the fungus *Erysiphe polyphaga*. The plants are subsequently placed in a greenhouse at 23–24° C. and at a relative atmospheric humidity of about 75%.

After 12 days, the infestation of the cucumber plants is determined as a percentage of the untreated but also fungi-inoculated control plants. 0% means no infestation; 100% that the infestation is exactly as great as in the case of the control plants.

The particular active compounds, the concentrations of such active compounds and the results obtained can be seen from the following Table 1.

TABLE 1.—ERYSIPHE TEST

| Active compound | | Infestation as a percentage of the infestation of the untreated control with a concentration of active compound (in percent) of— | | |
|---|---|---|---|---|
| | | 0.025 | 0.0062 | 0.0031 |
| (A) | $R_1$—NH—CH—NH—C—$R_2$ <br> $\quad\quad\quad\;\;\;\vert\quad\quad\;\;\;\Vert$ <br> $\quad\quad\quad\;CCl_3\quad\;\;O$ <br> (known) | | | |
| Where $R_1$ is— | Where $R_2$ is— | | | |
| ($Aa_1$) Cl—⌬— | —$CH_3$ | 80 | 100 | |
| ($Ab_1$) Cl—⌬(Cl)— | —$CH_3$ | 100 | 100 | |
| ($Ac_1$) Cl—⌬(Cl)— | —$CH_3$ | 73 | 100 | |

| (I) | R—NH—CH—NH—C(=O)—H <br> $\quad\quad\quad\quad\vert$ <br> $\quad\quad\quad\;\;CCl_3$ | | | |
|---|---|---|---|---|
| Where R is— | | | | |
| ($IV_1$) | ⌬ | 59 | 93 | |
| ($V_1$) | Cl—⌬ | 3 | 20 | 43 |
| ($VI_1$) | ⌬(Cl) | 43 | 73 | |
| ($III_1$) | Cl—⌬(Cl) | 0 | 0 | 0 |
| ($VII_1$) | Br—⌬(Cl) | 0 | 0 | 4 |
| ($VIII_1$) | Cl—⌬($CH_3$) | 0 | 0 | 20 |
| ($IX_1$) | $H_3C$—⌬(Cl) | 63 | 90 | |
| ($X_1$) | Cl—⌬(Cl)($CH_3$) | 57 | 87 | 100 |
| ($XI_1$) | Br—⌬(Br) | | 0 | 13 |
| ($XII_1$) | $NO_2$—⌬ | 40 | | |

TABLE 1.—ERYSIPHE TEST

| Active compound | | Infestation as a percentage of the infestation of the untreated control with a concentration of active compound (in percent) of— | | |
|---|---|---|---|---|
| | | 0.025 | 0.0062 | 0.0031 |
| ($XIII_1$) | Cl—⌬($NO_2$) | | 47 | 57 |
| ($XIV_1$) | $NO_2$—⌬(Cl) | 63 | | |
| ($XV_1$) | $NO_2$—⌬($CH_3$) | 43 | | |
| ($XVI_1$) | $CH_3$—⌬($NO_2$) | 7 | | |
| ($XVII_1$) | Br—⌬(F) | | 0 | 0 |

EXAMPLE 2

Podosphaera test (powdery mildew of apples) (Protective):

Solvent.—4.7 parts by weight acetone
Emulsifier.—0.3 parts by weight alkylaryl polyglycol ether
Water.—95 parts by weight The amount of the particular active compound required for the desired concentration of such active compound in the spray liquid is mixed with the stated amount of solvent, and the concentrate is diluted with the stated amount of which contains the stated emulsifier.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powder mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also fungi-inoculated control plants.

0% means no infestation; 100% means that the infestation is exactly as great as in the case of the control plants.

The particular active compounds, the concentrations of such active compounds and the results obtained can be seen from the following Table 2:

TABLE 2.—PODOSPHAERA TEST [PROTECTIVE]

| Active compound | | Infestation as a percentage of the infestation of the untreated control with a concentration of active compound (in percent) of— | |
|---|---|---|---|
| | | 0.1 | 0.025 |
| (A) | $R_1$—NH—CH—NH—C—$R_2$ <br> $\quad\quad\quad\;\;\;\vert\quad\quad\;\;\;\Vert$ <br> $\quad\quad\quad\;CCl_3\quad\;\;O$ <br> (known) | | |
| Where $R_1$ is— | Where $R_2$ is— | | |
| ($Aa_2$) Cl—⌬— | —$CH_3$ | 100 | |

TABLE 2—Continued

| Active compound | | Infestation as a percentage of the infestation of the untreated control with a concentration of active compound (in percent) of— | |
|---|---|---|---|
| | | 0.1 | 0.025 |
| Where $R_1$ is— | Where $R_2$ is— | | |
| ($Ab_2$) Cl–⌬–Cl | –CH$_3$ (with Cl) | 100 | |
| ($Ac_2$) Cl–⌬– (with Cl) | –CH$_3$ | 100 | |

$$(I) \quad R-NH-CH(CCl_3)-NH-\overset{O}{\underset{}{C}}-H$$

| | Where R is— | | |
|---|---|---|---|
| ($IV_2$) | ⌬ | 37 | 90 |
| ($V_2$) | Cl–⌬ | 0 | 30 |
| ($VI_2$) | ⌬–Cl | 55 | 78 |
| ($III_3$) | Cl–⌬–Cl | 0 | 5 |
| ($VIII_2$) | Cl–⌬–CH$_3$ | 3 | 20 |
| ($IX_2$) | H$_3$C–⌬–Cl | 13 | 39 |
| ($X_2$) | Cl–⌬–CH$_3$ | 39 | 68 |
| ($XVIII_1$) | Cl–⌬–Cl | 58 | 83 |
| ($XI_2$) | Br–⌬–Br | 14 | 67 |
| ($XVII_2$) | Br–⌬–F | ---- | 44 |
| ($VII_2$) | Br–⌬–Cl | 13 | 45 |

The process for producing the particular new active compounds of the present invention is illustrated, without limitation, by the following further examples.

EXAMPLE 3

(XIX$_1$)
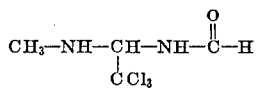
$$CH_3-NH-CH(CCl_3)-NH-\overset{O}{\underset{}{C}}-H$$

To a mixture of 19.3 g. N-(2,2,2-trichloro-1-hydroxyethyl)-formamide (=chloralformamide) and about 150 ml. benzene there is added dropwise a solution of 6 g. methylisocyanate in about 100 ml. benzene. Then a few drops of triethylamine are added to the mixture. An exothermic reaction takes place with the evolution of $CO_2$. There is obtained at first a clear solution, from which colorless crystal portions precipitate after a short time. Stirring is continued for a further period at about 35–40° C., followed by cooling to room temperature after the cessation of evolution of $CO_2$; filtration with suction is effected. The filtration residue is recrystallized from benzene, colorless crystals which melt at 90° C. being obtained. Yield: about 16 g. of N-methyl-N'-formyl-trichloroacetaldehyde aminal (i.e., N-[(1-methylamino-2,2,2-trichloro)-ethyl]-formamide).

EXAMPLE 4

(IV$_3$)
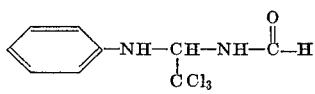

To a mixture of 19.3 g. chloralformamide and about 250 ml. acetonitrile there is added dropwise, with stirring, a solution of 11.9 g. phenylisocyanate in about 75 ml. acetonitrile; 3 drops of triethylamine are then added to the mixture. The temperature of the solution increases to about 35–40° C., with evolution of $CO_2$. Stirring is continued at this temperature until the end of the evolution of $CO_2$; evaporation in a vacuum is then effected. The solid residue is recrystallized from chlorobenzene and washed with carbon tetrachloride, colorless crystals melting at 99° C. being obtained.

Yield: about 20 g. of N-phenyl-N'-formyl-trichloroacetaldehyde aminal (i.e., N-[(1-phenylamino-2,2,2-trichloro)-ethyl]-formamide).

EXAMPLE 5

(V$_3$)
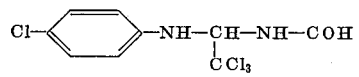

19.3 g. chloralformamide are stirred together with about 200 ml. acetonitrile. A solution of 15.5 g. 4-chlorophenylisocyanate in 100 ml. acetonitrile is added dropwise thereto, 2–4 drops of pyridine being added at the same time. There is obtained, in exothermic reaction, a clear solution which is stirred at 35–50° C. until the evolution of $CO_2$ has ceased.

Evaporation to dryness is then effected in a vacuum and the solid residue is recrystallized from toluene. There are obtained about 28 g. of colorless crystals (which melt at 80° C.) of N-(4-chlorophenyl)-N'-formyl-trichloroacetaldehyde aminal (i.e., N-[(1-[4'-chlorophenylamino]-2,2,2-trichloro)-ethyl]-formamide).

EXAMPLE 6

(III$_4$)
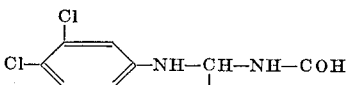

193 g. chloralformamide are stirred into about 1.5 liters acetonitrile and there is added to the mixture a solution of 189.5 g. 3,4-dichlorophenylisocyanate in 500 ml. acetonitrile. About 0.5 ml. triethylamine is then added dropwise to the mixture, which heats up to about 50–60° C. with strong evolution of $CO_2$. Stirring is continued at this temperature for about 1.5–2 hours, followed by evaporation to dryness in a vacuum. The solid residue is recrystallized from benzene or methanol/water, 300 g. of colorless crystals of N-(3,4-dichlorophenyl)-N'-formyl-trichloroacetaldehyde aminal (i.e., N-[(1-[3',4'-dichlorophenylamino]-2,2,2-trichloro) - ethyl] - formamide) being obtained; M.P. 120° C.

EXAMPLE 7

In the same manner as described in Examples 3–6, the following new compounds in accordance with the present invention are prepared:

EXAMPLE 7 TABLE $$R-NH-CH-NH-\overset{O}{\overset{\|}{C}}H$$
$$\overset{|}{C Cl_3}$$

| | Wherein R is — | M.P., °C. | | Wherein R is — | M.P., °C. |
|---|---|---|---|---|---|
| (XX₁) | $C_2H_5O-\langle\phantom{x}\rangle-$ | 167 | (XXIV₁) | $Cl-\langle\phantom{x}\rangle-$ with Cl (top), CH₃ (bottom) | 144 |
| (XXI₁) | $\langle\phantom{x}\rangle-$ with $C_3H_7$-iso (top), $C_3H_7$-iso (bottom) | 135 | (XXV₁) | $Cl-\langle\phantom{x}\rangle-$ with Cl (top), Cl (bottom) | 230 |
| (XXII₁) | $\langle\phantom{x}\rangle-$ with Cl, Cl | 162 | (X₃) | $Cl-\langle\phantom{x}\rangle-$ with CH₃ (top), Cl (bottom) | 156 |
| (XVIII₂) | $Cl-\langle\phantom{x}\rangle-$ with Cl | 142 | (XXVI₁) | $CH_3O-\langle\phantom{x}\rangle-$ with Cl | 116 |
| (XXIII₁) | $Cl-\langle\phantom{x}\rangle-$ with OCH₃ (top), Cl (bottom) | 170 | (XXVII₁) | $\langle\phantom{x}\rangle-$ with Cl, Cl | 112 |
| (XXVIII₁) | $\langle\phantom{x}\rangle-$ with Cl, Cl | 128 | (XXXI₁) | $\langle\phantom{x}\rangle-$ with Cl, CH₃ | 106 |
| (XXIX₁) | $CH_3-\langle\phantom{x}\rangle-$ with OCH₃ | 125 | (XXXII₁) | $\langle\phantom{x}\rangle-$ with CH₃ (top), Cl (bottom) | 143 |
| (XXX₁) | naphthyl | 137 | (XXXIII₁) | $Cl-\langle\phantom{x}\rangle-$ with CH₃ | 163 |
| (IX₃) | $CH_3-\langle\phantom{x}\rangle-$ with Cl | 106 | (VIII₃) | $Cl-\langle\phantom{x}\rangle-$ with CH₃ | 98 |
| (VII₃) | $Br-\langle\phantom{x}\rangle-$ with Cl | 136 | (XXXIV₁) | $C_{17}H_{35}$ | Yellow oil |
| (VI₃) | $\langle\phantom{x}\rangle-$ with Cl | 109 | (XIII₂) | $Cl-\langle\phantom{x}\rangle-$ with O₂N | 152 |
| (XXXV₁) | $\langle\phantom{x}\rangle-$ with Cl (top), CH₃ (bottom) | 89 | (XIV₂) | $O_2N-\langle\phantom{x}\rangle-$ with Cl | 195 |

EXAMPLE 7 TABLE

| Wherein R is — | M.P., ° C. | Wherein R is — | M.P., ° C. |
|---|---|---|---|
| (XI₃) Br-C₆H₄- (Br para) | 146 | (XXXVII₁) H₃CO-C₆H₃(O₂N)- | 136 |
| (XXXVI₁) (CH₃)₂N-C₆H₄- | 151 | (XVI₂) H₃C-C₆H₃(O₂N)- | 130 |
| (XII₂) O₂N-C₆H₄- | 191 | (XV₂) O₂N-C₆H₃(CH₃)- | 154 |

EXAMPLE 8

In the same manner as described in Examples 3–6 the following further new compounds in accordance with the present invention are prepared:

$$R-NH-CH(CCl_3)-NH-C(=O)-H$$

| Wherein R is— | M.P., ° C. |
|---|---|
| (XVII₃) Br-C₆H₃(F)- | 149 |
| (XXXVIII₁) O₂N-C₆H₃(Br)- | 141 |

EXAMPLE 9

Using corresponding molar amounts of N-(1-hydroxy-2,2,2-trichloro-ethyl)-formamide with each of the following isocyanates, respectively, in accordance with the procedure of Example 3:

(a) t-butyl-isocyanate;
(b) 7,8-dichlorooctyl-isocyanate;
(c) 7-isopropoxyheptyl-isocyanate;
(d) 11-bromo-12-methylmercapto-dodecyl-isocyanate;
(e) cyclopentyl-isocyanate;
(f) 4-chlorocyclohexyl-isocyanate;
(g) 2-methoxycyclopentyl-isocyanate;
(h) 3-bromo-5-n-butylmercapto-cyclooctyl-isocyanate;
(i) 2-cyano-4-t-butyl-phenyl-isocyanate;
(j) 3-methylmercapto-5-(N-ethyl-N-isopropylamino)-phenyl-isocyanate;
(k) 4-isopropylmercapto-phenyl-isocyanate;
(l) 3-iodo-4-cyano-5-nitro-phenyl-isocyanate; and
(m) 4-phenoxy-naphthyl-isocyanate;

the corresponding final products are produced:

(a′) N-[(1-t-butylamino-2,2,2-trichloro)-ethyl]-formamide;
(b′) N-[(1-[7′,8′-dichlorooctylamino]-2,2,2-trichloro)-ethyl]-formamide;
(c′) N-[(1-[7′-isopropoxyheptylamino]-2,2,2-trichloro)-ethyl]-formamide;
(d′) N-[(1-[11′-bromo-12′-methylmercapto-dodecylamino]-2,2,2-trichloro)-ethyl]-formamide;
(e′) N-[(1-cyclopentylamino-2,2,2-trichloro)-ethyl]-formamide;
(f′) N-[(1-[4′-chlorocyclohexylamino]-2,2,2-trichloro)-ethyl]-formamide;
(g′) N-[(1-[2′-methoxycyclopentylamino]-2,2,2-trichloro)-ethyl]-formamide;
(h′) N-[(1-[3′-bromo-5′-n-butylmercapto-cyclooctylamino]-2,2,2-trichloro)-ethyl]-formamide;
(i′) N-[(1-[2′-cyano-4′-t-butyl-phenylamino]-2,2,2-trichloro)-ethyl]-formamide;
(j′) N-[(1-[3′-methylmercapto-5′-(N′-ethyl-N′-isopropylamino)-phenylamino]-2,2,2-trichloro)-ethyl]-formamide;
(k′) N-[(1-[4′-isopropylmercapto-phenylamino]-2,2,2-trichloro)-ethyl]-formamide;
(l′) N-[(1-[3′-iodo-4′-cyano-5′-nitro-phenylamino]-2,2,2-trichloro)-ethyl]-formamide; and
(m′) N-[(1-[4′-phenoxy-naphthylamino]-2,2,2-trichloro)-ethyl]-formamide.

Advantageously, in accordance with the present invention, in the foregoing formulae:

R represents—

Straight and branched chain alkyl having 1–18 carbon atoms, such as methyl, ethyl, n-propyl, isopropyl, n-butyl, isobutyl, sec.-butyl, tert.-butyl, amyl, hexyl, heptyl, octyl, nonyl, decyl, undecyl, dodecyl, tridecyl, tetradecyl, pentadecyl, hexadecyl, heptadecyl, octadecyl, and the like, especially lower alkyl and preferably alkyl having 1–4 carbon atoms;

Cycloalkyl having 5–8 ring carbon atoms, such as cyclopentyl, cyclohexyl, cycloheptyl, cyclooctyl, and the like, especially cycloalkyl having 5–6 ring carbon atoms;

Such alkyl and/or cycloalkyl of the foregoing type which are mono, di, poly and mixed substituted with one or more of halo such as chloro, bromo, iodo and fluoro, especially chloro, bromo and/or fluoro; and/or Lower alkoxy such as methoxy, ethoxy, n-propoxy, isopropoxy, n-butoxy, isobutoxy, sec.-butoxy, tert.-butoxy, and the like, especially alkoxy having 1–4 atoms; and/or Lower alkylmercapto such as methylmercapto, ethylmercapto, n-propylmercapto, isopropylmercapto, n-butylmercapto, isobutylmercapto, sec. - butylmercapto, tert.-butylmercapto, and the like, especially alkylmercapto having 1-4 carbon atoms;
Phenyl;
Naphthyl; and
Such phenyl and/or naphthyl which are mono, di, poly and mixed substituted with one or more of halo as noted above;
Lower alkyl such as methyl to tert.-butyl inclusive, and the like, as noted above, and especially alkyl having 1-4 carbon atoms;
Lower alkoxy as noted above;
Lower alkylmercapto as noted above;
Nitro;
Di (lower alkyl) amino such as di-methyl, ethyl, n-propyl, isopropyl, n-butyl, isobutyl, sec.-butyl, tert.-butyl -amino, methyl-ethyl, methyl-propyl, methyl-butyl, ethyl-propyl, ethyl-butyl, propyl-butyl -amino, and the like, especially di ($C_{1-4}$ alkyl) amino;
Cyano; and
Phenoxy.

Preferably, R is alkyl having 1-18 carbon atoms, phenyl, naphthyl, and substituted phenyl which is mono, di, tri and mixed substituted with chloro, bromo, fluoro, lower alkyl, nitro, lower alkoxy and/or diloweralkyl-amino, and especially phenyl and substituted phenyl which is substituted in the 3- and/or 4-positions with fluoro, chloro, bromo and/or lower alkyl such as methyl, ethyl, isopropyl, and the like.

In accordance with one specific feature of the present invention, R is phenyl or substituted phenyl which is mono or di substituted with chloro, bromo, fluoro, lower alkyl and/or nitro.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. N-[(1-amino-2,2,2-trichloro)-ethyl]-formamide having the formula

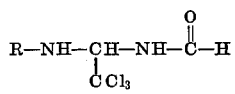

in which R is selected from the group consisting of alkyl having 1-18 carbon atoms, cycloalkyl having 5-8 ring carbon atoms, phenyl, naphthyl, 3-chloro-phenyl, 3-dilower alkylamino-phenyl having 1-4 carbon atoms in each lower alkyl moiety, 4-chloro-phenyl, 4-nitro-phenyl, 4-lower alkoxy-phenyl having 1-4 carbon atoms in the lower alkoxy moiety, 2,3-dichloro-phenyl, 2-lower alkyl-3-chloro-phenyl having 1-4 carbon atoms in the lower alkyl radical, 2,4-dichloro-phenyl, 2-lower alkyl-4-chloro-phenyl having 1-4 carbon atoms in the lower alkyl moiety, 2,5-dichloro-phenyl, 2-lower alkyl-5-chloro-phenyl having 1-4 carbon atoms in the lower alkyl moiety, 2-chloro-5-lower alkyl-phenyl having 1-4 carbon atoms in the lower alkyl moiety, 2,6-di-lower alkyl-phenyl having 1-4 carbon atoms in each lower alkyl moiety, 3,4-dichloro-phenyl, 3 - chloro - 4 - bromo-phenyl, 3-lower alkyl-4-chloro-phenyl having 1-4 carbon atoms in the lower alkyl moiety, 3-chloro-4-lower alkyl-phenyl having 1-4 carbon atoms in the lower alkyl moiety, 3,4-dibromo-phenyl, 3-nitro-4-chloro-phenyl, 3-chloro-4-nitro-phenyl, 3 - lower alkyl-4-nitro-phenyl having 1-4 carbon atoms in the lower alkyl moiety, 3-nitro-4-lower alkyl-phenyl having 1-4 carbon atoms in the lower alkyl moiety, 3-fluoro-4-bromo-phenyl, 3-chloro-4-lower alkoxy-phenyl having 1-4 carbon atoms in the lower alkoxy moiety, 3-lower alkoxy-4-lower alkyl-phenyl having 1-4 carbon atoms in the lower alkoxy moiety and 1-4 carbon atoms in the lower alkyl moiety, 3-nitro-4-lower alkoxy-phenyl having 1-4 carbon atoms in the lower alkoxy moiety, 3-bromo-4-nitro-phenyl, 3,5-dichloro-phenyl, 2-lower alkyl-4,5-dichloro-phenyl having 1-4 carbon atoms in the lower alkyl moiety, 2-lower alkoxy - 4,5 - dichloro-phenyl having 1-4 carbon atoms in the lower alkoxy moiety, 2,4-dichloro-5-lower alkyl-phenyl having 1-4 carbon atoms in the lower alkyl moiety and 3,4,5-trichloro-phenyl.

2. Formamide according to claim 1 wherein R is selected from the group consisting of alkyl having 1-18 carbon atoms, phenyl, naphthyl, 3-chloro-phenyl, 3-dilower alkylamino-phenyl having 1-4 carbon atoms in each lower alkyl moiety, 4-chloro-phenyl, 4-nitro-phenyl, 4-lower alkoxy-phenyl having 1-4 carbon atoms in the lower alkoxy moiety, 2,3-dichloro-phenyl, 2-lower alkyl - 3 - chloro-phenyl having 1-4 carbon atoms in the lower alkyl radical, 2,4-dichloro-phenyl, 2-lower alkyl-4-chloro-phenyl having 1-4 carbon atoms in the lower alkyl moiety, 2,5-dichloro-phenyl, 2-lower alkyl-5-chloro-phenyl having 1-4 carbon atoms in the lower alkyl moiety, 2-chloro-5-lower alkyl-phenyl having 1-4 carbon atoms in the lower alkyl moiety, 2,6-di-lower alkyl-phenyl having 1-4 carbon atoms in each lower alkyl moiety, 3,4-dichloro-phenyl, 3-chloro-4-bromo-phenyl, 3-lower alkyl-4-chloro-phenyl having 1-4 carbon atoms in the lower alkyl moiety, 3-chloro - 4 - lower alkyl-phenyl having 1-4 carbon atoms in the lower alkyl moiety, 3,4-dibromo-phenyl, 3-nitro-4-chloro-phenyl, 3-chloro-4-nitro-phenyl, 3 - lower alkyl-4-nitro-phenyl having 1-4 carbon atoms in the lower alkyl moiety, 3-nitro-4-lower alkyl-phenyl having 1-4 carbon atoms in the lower alkyl moiety, 3-fluoro-4-bromo-phenyl, 3-chloro-4-lower alkoxy-phenyl having 1-4 carbon atoms in the lower alkoxy moiety, 3-lower alkoxy-4-lower alkyl-phenyl having 1-4 carbon atoms in the lower alkoxy moiety and 1-4 carbon atoms in the lower alkyl moiety, 3-nitro-4-lower alkoxy-phenyl having 1-4 carbon atoms in the lower alkoxy moiety, 3-bromo-4-nitro-phenyl, 3,5-dichloro-phenyl, 2-lower alkyl-4,5-dichloro-phenyl having 1-4 carbon atoms in the lower alkyl moiety, 2-lower alkoxy-4,5-dichloro-phenyl having 1-4 carbon atoms in the lower alkoxy moiety, 2,4-dichloro-5-lower alkyl-phenyl having 1-4 carbon atoms in the lower alkyl moiety and 3,4,5-trichloro-phenyl.

3. Formamide according to claim 1 wherein R is selected from the group consisting of 3-chloro-phenyl, 3-dimethylamino-phenyl, 4-chloro-phenyl, 4-nitro-phenyl, 4-ethoxy-phenyl, 2,3 - dichloro-phenyl, 2-methyl-3-chloro-phenyl, 2,4-dichloro-phenyl, 2-methyl-4-chloro-phenyl, 2,5-dichloro-phenyl, 2-methyl-5-chloro-phenyl, 2-chloro-5-methyl-phenyl, 2,6 - di-isopropyl-phenyl, 3,4 - dichloro-phenyl, 3-chloro-4-bromo-phenyl, 3-methyl-4-chloro-phenyl, 3-chloro-4-methyl-phenyl, 3,4-dibromo-phenyl, 3-nitro-4-chloro-phenyl, 3 - chloro-4-nitro-phenyl, 3-methyl-4-nitro-phenyl, 3-nitro-4-methyl-phenyl, 3 - fluoro-4-bromo-phenyl, 3-chloro-4-methoxy-phenyl, 3 - methoxy-4-methyl-phenyl, 3-nitro-4-methoxy-phenyl, 3-bromo-4-nitro-phenyl, 3,5-dichloro-phenyl, 2-methyl-4,5-dichloro-phenyl, 2-methoxy-4,5-dichloro-phenyl, 2,4-dichloro-5-methyl - phenyl and 3,4,5-trichloro-phenyl.

4. The compound N-[(1-[3',4'-dichlorophenylamino]-2,2,2-trichloro)-ethyl]-formamide having the formula

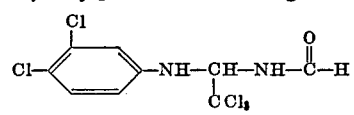

5. The compound N-[(1-phenylamino-2,2,2-trichloro)-ethyl]-formamide having the formula

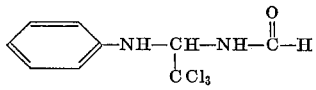

6. The compound N-[(1-[3'-chloro-4'-bromo-phenylamino]-2,2,2-trichloro)-ethyl] - formamide having the formula

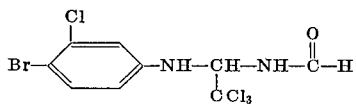

7. The compound N-[(1-[3'-methyl-4'-chloro-phenylamino]-2,2,2-trichloro) - ethyl] - formamide having the formula

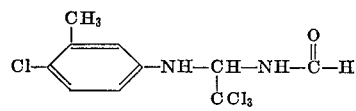

8. The compound N-[(1-[3'-nitro-4'-methyl-phenylamino]-2,2,2-trichloro) - ethyl] - formamide having the formula

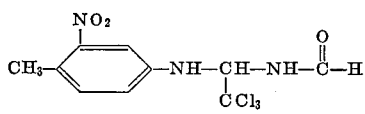

9. The compound N-[(1-[3'-fluoro-4'-bromo-phenylamino]-2,2,2 - trichloro) - ethyl] - formamide having the formula

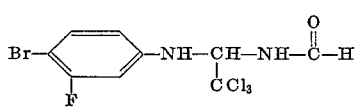

10. The compound N-[(1-[4'-chlorophenylamino]-2,2,2-trichloro)-ethyl]-formamide having the formula

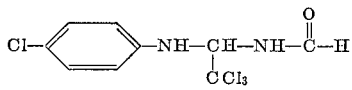

11. The compound N - [(1-[3',4' - dibromophenylamino]-2,2,2-trichloro)-ethyl] - formamide having the formula

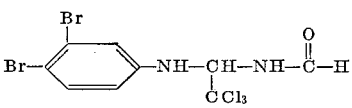

12. The compound N-[(1-[3'-nitro-4'-chloro-phenylamino] - 2,2,2-trichloro)-ethyl] - formamide having the formula

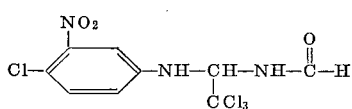

References Cited

Sidgwicks Organic Chemistry of Nitrogen, 3rd ed. p. 464 (1966).

Bohme et al., Archiv. Pharm., vol. 294, pp. 307–11, (1961).

HENRY R. JILES, Primary Examiner

H. I. MOATZ, Assistant Examiner

U.S. Cl. X.R.

260—561; 424—320, 324